United States Patent [19]

Marsh

[11] Patent Number: 4,459,858
[45] Date of Patent: Jul. 17, 1984

[54] FLOW METER HAVING AN ELECTROMAGNETIC SENSOR PROBE

[75] Inventor: Lawrence B. Marsh, Silver Spring, Md.

[73] Assignee: Marsh-McBirney, Inc., Gaithersburg, Md.

[21] Appl. No.: 500,086

[22] Filed: Jun. 1, 1983

Related U.S. Application Data

[63] Continuation-in-part of Ser. No. 303,555, Sep. 18, 1981, abandoned.

[51] Int. Cl.³ .............................................. G01F 1/58
[52] U.S. Cl. .............................. 73/861.12; 73/861.15
[58] Field of Search ........... 73/861.12, 861.15, 861.02, 73/861.13; 364/510

[56] References Cited

U.S. PATENT DOCUMENTS

| | | | |
|---|---|---|---|
| 3,668,931 | 6/1972 | Zanker et al. | 73/861.12 |
| 3,834,232 | 9/1974 | Gruner et al. | 73/861.12 |
| 4,079,626 | 3/1978 | Gardner | 73/861.15 |
| 4,125,019 | 11/1978 | Cushing | 73/861.12 |
| 4,297,897 | 11/1981 | Young | 73/861.12 |
| 4,300,400 | 11/1981 | Bistrian et al. | 73/861.28 |

OTHER PUBLICATIONS

Lubcke, "Inductive Flow Measurement by Flat Measuring Probes," Automatisierungspraxis, vol. 12, No. 8, (Aug. 1975), pp. 187-190.

Primary Examiner—S. Clement Swisher
Assistant Examiner—John E. Chapman, Jr.
Attorney, Agent, or Firm—Laubscher, Philpitt & Laubscher

[57] ABSTRACT

A flow meter for measuring the velocity of fluid flow in a conduit is disclosed, characterized in that an electromagnetic sensor probe is mounted within an opening contained in the conduit for generating electrical signals as a function of the velocity of fluid flow. The probe has a debris shedding head portion which protrudes into the interior of the conduit and includes an electromagnet for generating an electromagnetic field in the fluid, the axis of the field extending normal to the direction of fluid flow. The probe further includes a plurality of electrodes arranged beyond the poles of the electromagnet and adjacent the fluid for producing the electrical signals in response to the flow of fluid through the electromagnetic field. Signal processing apparatus is connected with the sensor probe for converting the electrical signals into a flow velocity output signal.

17 Claims, 16 Drawing Figures

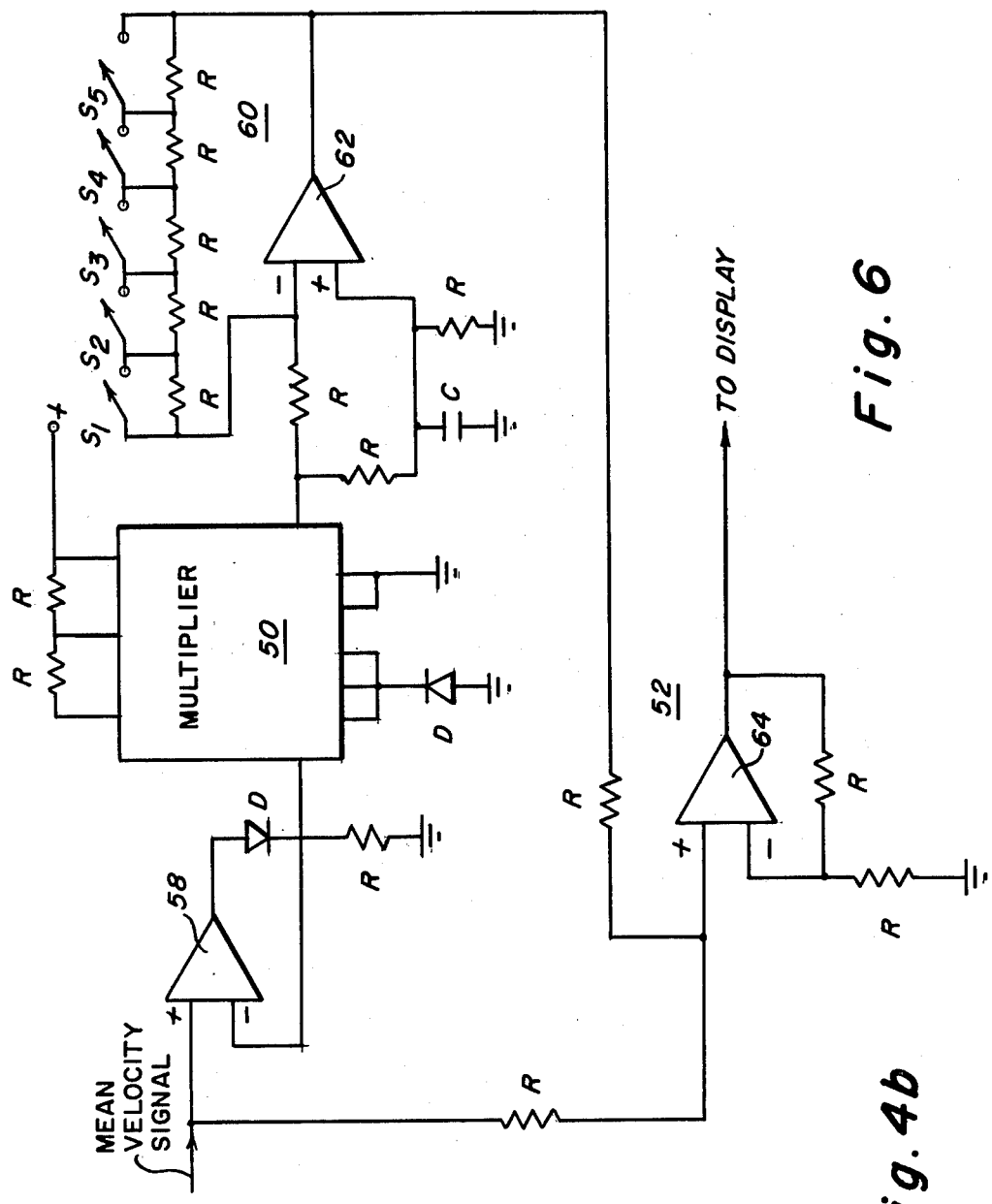
Fig. 6
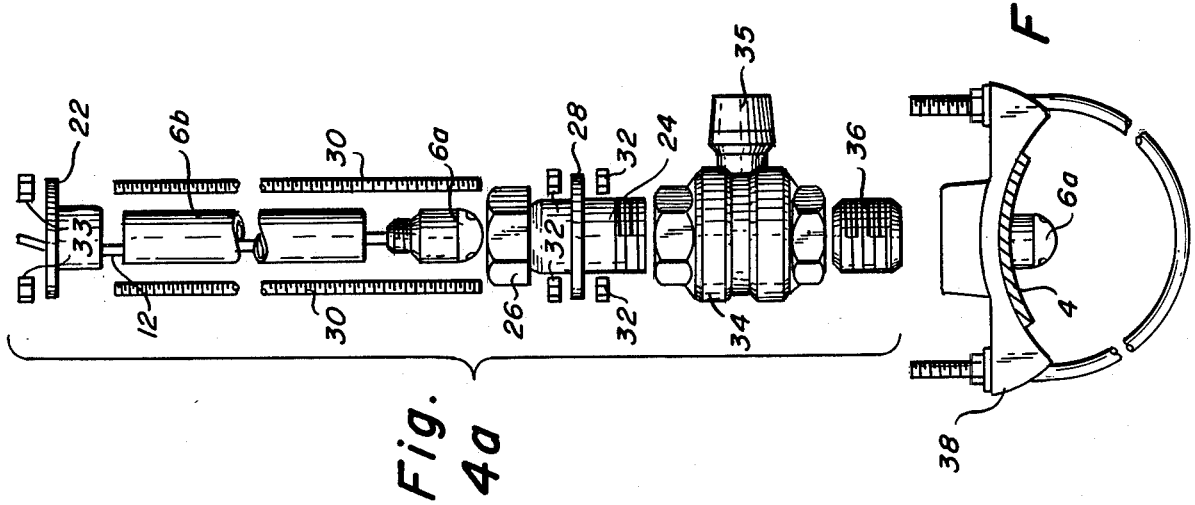
Fig. 4a
Fig. 4b

FLOW METER HAVING AN ELECTROMAGNETIC SENSOR PROBE

This application is a continuation-in-part of application Ser. No. 303,555 filed Sept. 18, 1981, now abandoned.

FIELD OF THE INVENTION

The present invention relates to a fluid flow meter having an electromagnetic sensor probe which protrudes into a conduit and generates electrical signals as a function of the velocity of fluid flow within the conduit.

BRIEF DESCRIPTION OF THE PRIOR ART

Electromagnetic flow meters of the Faraday type are well-known in the patented prior art as evidenced by the patents to Marsh U.S. Pat. No. 3,885,443, Darby U.S. Pat. No. 3,898,881 and Marsh U.S. Pat. No. 4,015,471 all of which are assigned to the assignee of the instant invention.

Probe type electromagnetic flow and velocity meters are disclosed in the patents to Griswold U.S. Pat. No. 3,161,047 and Zanker et al. U.S. Pat. No. 3,668,931, respectively. Generally, these prior probe type flow meters protrude from the hull of a ship and are used to measure the velocity of the ship passing through a body of water. More particularly, the probes generally extend into the body of water perpendicularly to the boat hull at a significant distance to obtain an accurate signal from the electrodes which are arranged between the poles of the electromagnet and the boat hull. An inherent drawback of the prior probe type electromagnetic flow meters is that they are not suitable for use for measuring fluid flow in a conduit. As noted above, the prior flow meters must extend a significant distance into the fluid whose flow is being measured to obtain a proper signal from the electrodes owing to their arrangement relative to the field generated by the electromagnet. Because of this excessive protrusion, debris within the fluid accumulates on the probe and distorts fluid flow, causing errors in the electrical signals corresponding to flow velocity which are generated by the electrodes.

In order to overcome these disadvantages, an electromagnetic probe type flow meter of the type disclosed in the patent to Cushing U.S. Pat. No. 4,125,019 was developed. In the Cushing device the sensor probe has the sensing electrodes mounted on the sides thereof, and the probe extends to a considerable degree into a conduit with the longitudinal axis of the probe arranged at an acute angle relative to a direction perpendicular to the direction of fluid flow, whereby debris is shed from the probe. While this type of flow meter normally operates satisfactorily, it suffers inherent limitations in accuracy since it senses flow profiles in a plane which is not perpendicular to the direction of fluid flow, whereby the sensed flow profiles are distorted.

The present invention was developed in order to overcome the above and other drawbacks of the prior devices by providing a probe type electromagnetic flow meter wherein a debris shedding portion of the probe, having a unique arrangement of sensing electrodes relative to the poles of the electromagnet, protrudes into a conduit for sensing flow profiles in a plane normal to the direction of fluid flow, and further wherein the signals corresponding to fluid flow velocity are compensated for non-linearities in the flow profiles.

SUMMARY OF THE INVENTION

Accordingly, it is a primary object of the present invention to provide a flow meter for measuring the velocity of fluid flow in a conduit, including an electromagnetic sensor probe for generating electrical signals as a function of the velocity of fluid flow within the conduit. The probe includes a debris shedding sensing head portion and a body portion, and probe mounting apparatus is provided for mounting the probe within an opening contained in the conduit with the longitudinal axis of the probe extending normal to the direction of fluid flow in the conduit and with the sensing head portion protruding into the interior of the conduit. The probe further includes an electromagnet for generating an electromagnetic field in the fluid with the axis of the field extending normal to the direction of flow. A plurality of electrodes are mounted in the probe sensing head portion for producing the electrical signals in response to the flow of fluid through the electromagnetic field. The electrodes are arranged beyond the poles of the electromagnet relative to the conduit wall and include at least a pair of sensing electrodes symmetrically arranged relative to the field aixs along a line transverse to the direction of fluid flow.

According to another object of the invention, the flow meter further includes a processing device connected with the sensor probe for converting the electrical signals into a flow velocity output signal.

According to yet another object of the invention, the flow meter processing apparatus includes a mean velocity adjustment device for producing a mean velocity signal corresponding to the electrical signals and circuitry for modifying the mean velocity signal to correct for nonlinearities in the Reynolds number.

According to a further object of the invention, the portion of the sensing head which protrudes into the conduit is configured to shed debris and to minimize the distortion of the electrical signals owing to eddies produced in the fluid by the protruding probe.

According to a preferred embodiment of the invention, the configuration of the probe sensing head enables the flow meter to sense flow velocities in opposite directions.

BRIEF DESCRIPTION OF THE FIGURES

Other objects and advantages of the subject invention will become apparent from a study of the following specification when viewed in the light of the accompanying drawing, in which:

FIG. 4a is an exploded plan view of the sensor probe mounting assembly;

FIG. 4b is a plan view of the sensor probe mounting assembly with the sensor probe in its operative position;

FIG. 6 is a detailed circuit diagram of the signal modifier of the flow meter signal processing apparatus;

DETAILED DESCRIPTION

Figure 1:
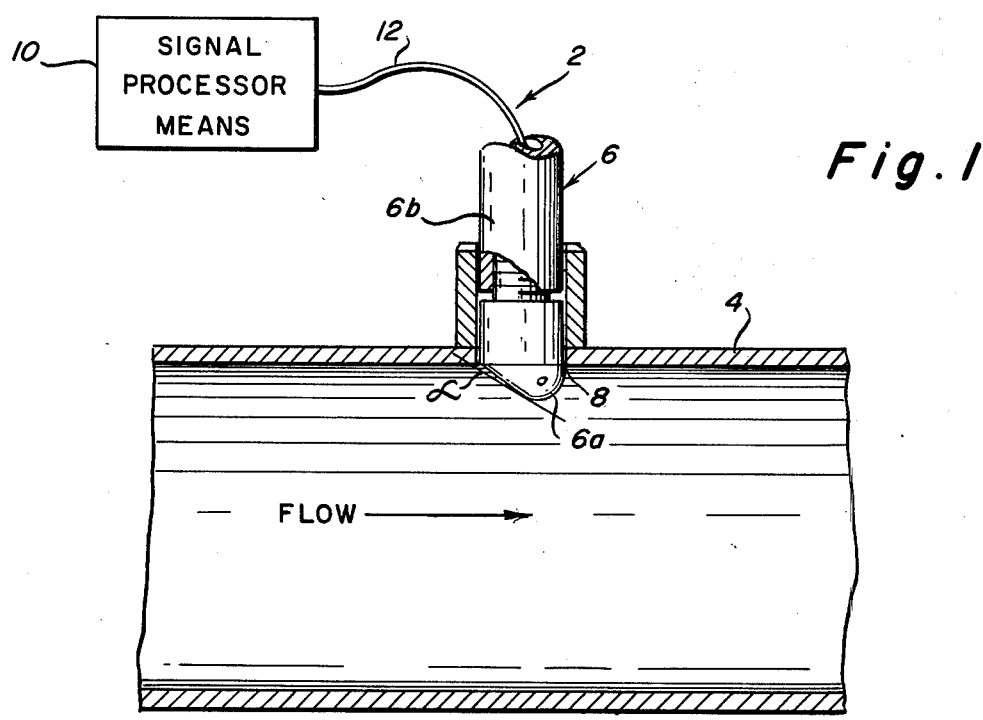
FIG. 1 is a partial sectional view of the flow meter with the sensor probe mounted in an opening in the wall of a conduit.

Referring first more particularly to FIG. 1, the subject invention relates to a flow meter 2 for measuring the velocity of fluid flow in a conduit 4. The flow meter includes an electromagnetic sensor probe 6 mounted in an opening 8 in the conduit wall for generating electrical signals as a function of the velocity of fluid flow within the conduit. The electrical signals are delivered to a signal processor 10 via a cable 12 where the electrical signals are converted to a flow velocity output signal which represents the velocity of fluid flow in the conduit.

The flow meter sensor probe 6 includes a debris shedding head portion 6a which protrudes into the conduit, and a generally cylindrical body portion 6b connected with the head portion. As will be developed in greater detail below, apparatus is provided for mounting the sensor probe within the conduit opening with the longitudinal axis of the probe being arranged normal to the direction of fluid flow within the conduit to obtain accurate flow profiles.

Figure 2:
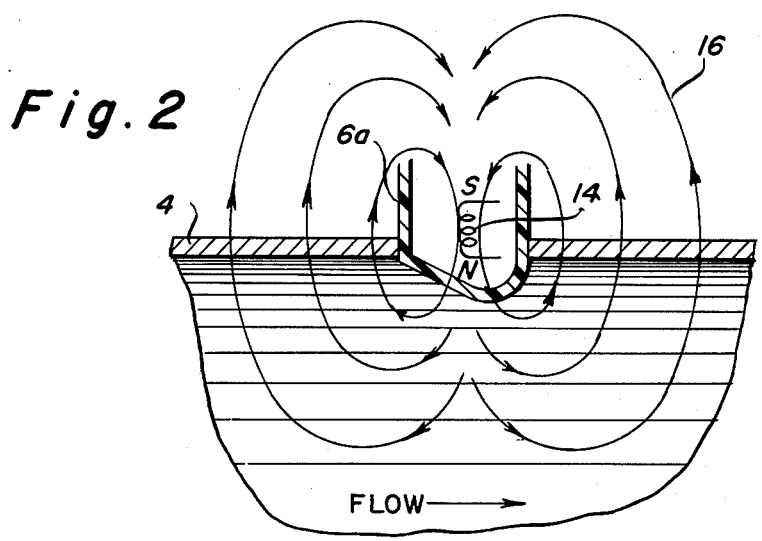
FIG. 2 is a partial sectional view illustrating the electromagnetic field generated by the sensor probe mounted in the conduit.
Figure 8A:
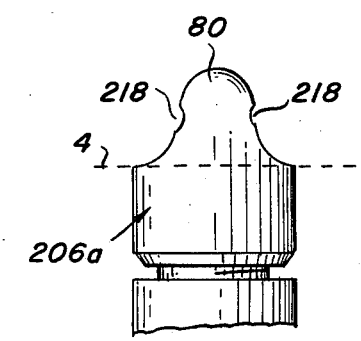
FIGS. 8a-8c are rear, side, and top views, respectively of a third configuration of the sensor probe head portion.
Figures 8B, 8C:
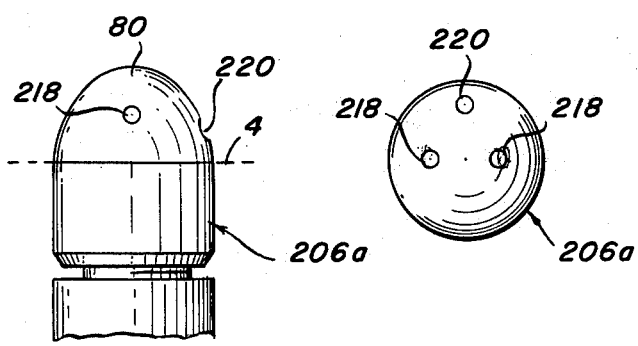

As shown in FIGS. 2 and 3, the sensor probe head portion 6a includes a magnet and a plurality of electrodes. Referring first to FIG. 2, centrally arranged within the interior of the sensor probe head portion is an electromagnet 14 having poles S and N on opposite ends thereof. The electromagnet establishes an electromagnetic field 16 in the fluid flowing through the conduit with the axis of the field extending through the conduit in a direction normal to the direction of fluid flow. As shown in FIG. 3, a plurality of electrodes are embedded in the remote outer surface of the protruding portion of the sensor probe head portion beyond the poles of the electromagnet. While the electrodes are preferably mounted flush with the outer surface of the head portion, the electrodes may be recessed slightly as shown in FIGS. 8a-8c to eliminate contamination from grease or oil. The plurality of electrodes preferably comprise a pair of sensing electrodes 18 and a ground electrode 20. The sensing electrodes are symmetrically arranged relative to the electromagnetic field axis along a line transverse to the direction of fluid flow. The sensor probe is formed of any suitable material such as a synthetic plastic material which is light-weight, durable, inexpensive, and resistant to corrosion.

The apparatus for mounting the flow meter sensor probe in an opening contained in the conduit will be described with reference to FIGS. 4a and 4b. The sensor probe head portion 6a is threadably connected with the generally cylindrical probe body portion 6b and the cable 12 to the signal processor extends from the probe body portion. An end cap 22 is adapted to fit over the end of the probe body portion. The sensor probe head portion is inserted into a compression seal assembly 24 having a compression nut 26. Tightening of the nut compresses the seal assembly into sealing engagement with the sensor probe head portion. The compression seal assembly includes a lower restraining plate 28, and threaded retaining rods 30 pass through aligned openings in the end cap and lower restraining plate, respectively. Tightening of the nuts 32 serves to draw the end cap toward the lower restraining plate to further connect the probe assembly with the compression seal assembly.

The lower end of the compression seal assembly 24 is threadably connected with a ball valve assembly 34 including a knob 35 for opening and closing the valve in a manner similar to a stop cock. An opening is cut into the wall of the conduit by conventional means (not shown) and a threaded pipe nipple 36 is threadably connected with the pipe nipple, whereby the sensor probe head portion 6a protrudes within the conduit 4 as shown in FIG. 4b. The degree of protrusion of the sensor probe head portion into the conduit is controlled via the upper captive nuts 33. Turning the captive nuts 33 in opposite directions extends and retracts the sensor probe head portion, respectively, relative to the conduit. The limited protrusion of the sensor probe head portion into the conduit further prevents debris from accumulating on the probe. A clamping assembly 38 as shown in FIG. 4b is also provided to secure the mounting assembly in position adjacent the opening in the conduit and to maintain the longitudinal axis of the probe normal to the direction of fluid flow.

Energization of the electromagnet in the sensor probe head portion establishes an electromagnetic field in the fluid, the axis of the field being arranged normal to the direction of fluid flow. In accordance with Faraday's Law, a voltage is generated in the fluid as the fluid moves through the electric field, the voltage being directly proportional to the velocity of the fluid. The sensing electrodes embedded in the surface of the sensor probe head portion sense the generated voltage and produce electrical signals which are a function of the flow velocity. The electrical signals are delivered to the signal processor via the electric cable.

The electrical signals produced by the sensor probe of the subject invention are more accurate representations of fluid flow velocity than the signals produced by prior electromagnetic sensor probes for a number of reasons. Of primary importance is the arrangement of the sensing electrodes relative to the electromagnetic field. As noted above, the longitudinal axis of the probe is arranged normal to the direction of fluid flow, as is the longitudinal axis of the electromagnetic field. Owing to this arrangement, flow profiles are taken in a plane perpendicular to the direction of fluid flow, resulting in very accurate flow profile. The sensing electrodes are arranged in an "end fire" configuration wherein the electrodes are placed beyond the poles of a sinusoidal electromagnetic field rather than midway between the poles. This design allows the sensing of fluid flow velocity to occur at the remote end of the sensor probe head portion for minimum protrusion in the conduit. Moreover, the probe senses the velocity of fluid at a spaced distance therefrom. This characteristic of the invention is significant since nonlinearities in the electrical signals produced by the sensing electrodes are diminished. More particularly, the protruding probe head produces turbulence and drag in the fluid about the probe surface. When sensed by the electrodes, this flow/sensor interaction produces signals that do not give an accurate measure of the free stream velocities.

With the "end fire" electrode configuration, however, the interference of the eddies is reduced since the electrodes are able to sense the velocity of fluid flow at a spaced distance from the probe head well beyond the near surface of the probe head portion.

Figure 5:
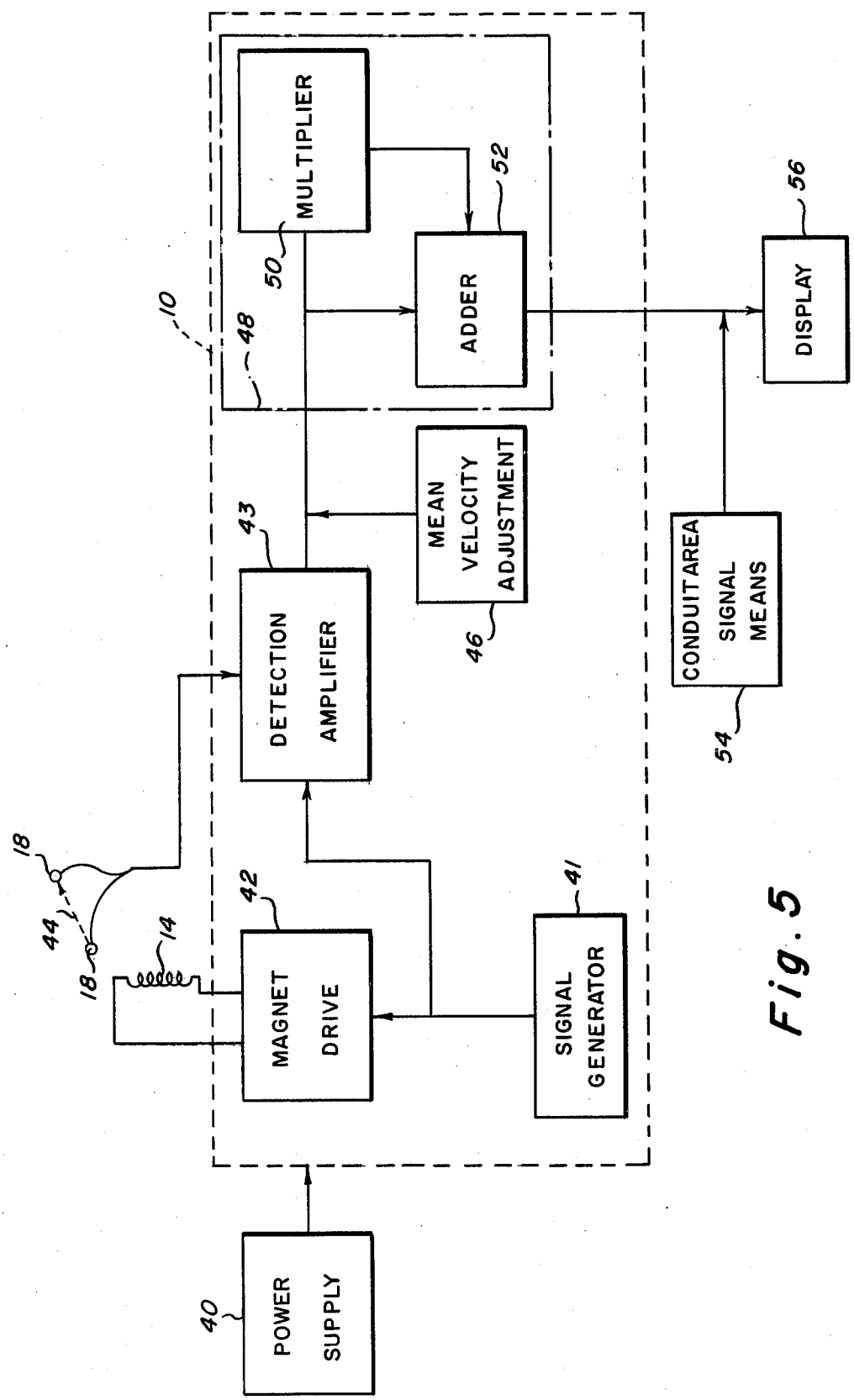
FIG. 5 is a block diagram of the flow meter signal processing apparatus.

Referring now to FIG. 5, the signal processor 10 will be described. A power supply 40 provides power to the signal processor 10. The signal processor includes a signal generator 41 which delivers switching signals to a magnet driver 42 which in turn supplies an alternating current to the electromagnet 14 to generate an electromagnetic field. The signal generator 41 also delivers operating signals to a detection amplifier 43 of the signal processor. The flow of fluid through the electromagnetic field generates a voltage proportional to the flow velocity. The voltage is sensed by the sensing electrodes 18 as indicated schematically by the arrow 44. In response to the sensed voltage, the electrodes generate electrical signals which are amplified and delivered to the detection amplifier of the signal processor where the electrical signals are extracted from electrical background noise.

The electrical signals corresponding to the velocity flow are adjusted in a conventional manner by an adjustment device 46 to produce a signal that represents the mean velocity which is delivered to a signal modifying apparatus 48 to provide a Reynolds correction as will be developed in greater detail below. For example, for normal well-developed flow, the mean velocity $\overline{V}$ is equal to the point velocity, when the point velocity is measured at $\frac{1}{8}$ of the diameter of the conduit. If the flow conditions are not normal or are unknown, the sensor probe is used to profile the conduit to determine the mean velocity $\overline{V}$. This is accomplished by sensing the velocities at various points along the diameter of the conduit with the probe and then averaging the various sensed velocities. In either case, after the mean velocity is calculated, it is recorded and the sensor probe is retracted to its normal measurement position wherein the sensor probe head portion protrudes into the conduit and the cylindrical body portion extends on the outside of the conduit. The flow meter is then adjusted to read the calculated mean velocity $\overline{V}$. The adjustment is made because the velocity profiles in a conduit are such that the velocity of a fluid near the conduit wall is less than the mean velocity.

The signal processor 10 further includes a signal modifying apparatus 48 for modifying the mean velocity signal in a dynamic sense to correct nonlinearities in Reynolds number. More specifically, fluid flow velocity profiles change with changes in velocity and/or viscosity in a fixed diameter conduit. Variances in the velocity profile reflect variances in Reynolds number and result in errors in fluid flow determination by point measurement techniques. To provide correction for this nonlinear phenomenon, a portion of the mean velocity signal is supplied to a multiplier 50 such as the National Semiconductor Model LH 0094 where the signal is squared. The squared portion of the mean velocity signal is then supplied to an adder 52 where it is combined with the original velocity signal to produce a modified mean velocity signal having a first order correction. Additional modification of the mean velocity signal can be performed by analog circuitry or by a digital microprocessor if high accuracies in the measuring of the mean velocity signal are desired.

Since the actual flow velocity Q of a fluid flowing in a conduit having an area A is given by the equation $$Q = \overline{V} \times A$$

it is necessary to provide an input signal representing the area of the conduit. A conduit area signal device 54 is provided by which the conduit area is entered into the signal processor for combination with the modified mean velocity signal to provide the actual flow velocity Q. For example, where the conduit is cylindrical in shape, the area of the conduit is given by the equation $$A = \pi r^2$$

where r = radius of the conduit. Accordingly, the conduit area signal means produces an area signal for a conduit containing a fluid flow whose velocity is to be measured in accordance with the radius of the conduit.

The resulting flow velocity signal is delivered to a display device 56 for display.

A schematic representation of the mean velocity signal modifying apparatus of the signal processing device is provided in FIG. 6. A portion of the mean velocity signal from the amplifier is supplied to a first operational amplifier 58, the output of which is delivered to the multiplier circuit 50 where the signal is squared. Since the flow meter may be used in pipes of different diameters, the mean velocity signal modifying apparatus is made diameter sensitive. More particularly, it is known that the velocity profile near the wall of a conduit varies with Reynolds number which is a function of velocity, conduit diameter, and fluid viscosity. Assuming the fluid viscosity to be constant, a correction for non-linearities in the velocity profile owing to conduit diameter must be introduced into the mean velocity adjustment. The correction is a function of the ratio of the probe insertion depth (i.e. the distance from the conduit wall where the electrodes sense flow velocity) to the conduit internal diameter. A selector 60 comprising a plurality of resistors, switches $S_1$–$S_5$, and a second operational amplifier 62 automatically produces the appropriate correction or compensation for Reynolds number non-linearities in accordance with the manual input—via the switches—of pipe diameter. The output from the selector is delivered to the adder 52 which includes a third operational amplifier 64 such as the National Semiconductor Model LM 324. At the adder 52 the squared portion of the velocity signal is combined with the original mean velocity signal to produce a velocity output signal compensated for nonlinearities in Reynolds number.

Figures 3A, 3B, 3C:
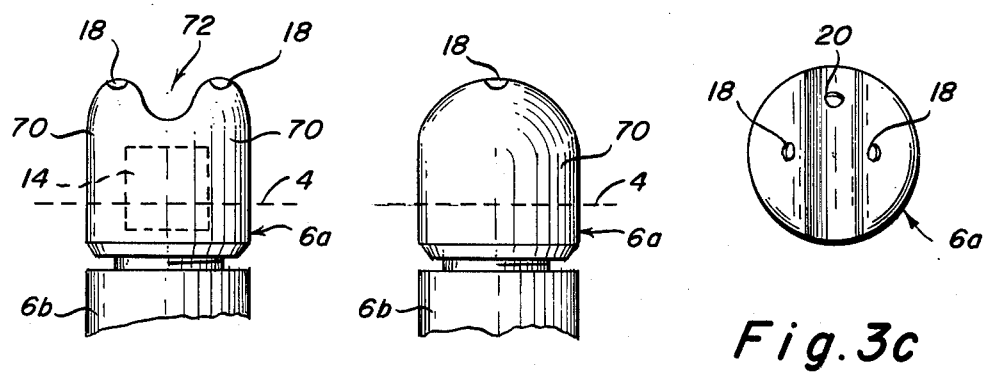
FIGS. 3a, 3b, and 3c are rear, side, and top views, respectively of the preferred configuration of the sensor probe head portion.

Referring now once again to FIGS. 3a–3c, the preferred configuration of the sensor probe head portion will be described. The remote portion of the sensing head portion 6a (i.e. the portion furthest from the probe body portion 6b) comprises a pair of spaced, parallel, generally parabolic portions 70 which define a trough 72 therebetween. When mounted in an opening in the conduit wall 4, the parabolic portions 70 and the trough 72 protrude into the interior of the conduit while the electromagnet 14 arranged within the sensing head portion is arranged adjacent the conduit opening. The parabolic portions 70 are arranged generally parallel with the direction of fluid flow so that the fluid may flow directly through the trough 72 with little or no impedance in flow owing to the parabolic portions. The sensing electrodes 18 are arranged at the apices of the parabolic portions, respectively, as shown in FIGS. 3a and 3b, and the ground electrode 20 is arranged between the parabolic portions in the base of the trough adjacent the periphery of the sensing head portion as shown in FIG. 3c. With this preferred sensing head portion configuration, all of the fluid which flows through the trough contributes to the electrical signal produced by the sensing electrodes as does the fluid just outside of the trough. Since these fluids are spaced from the eddies produced at the probe surface, they do not contribute nonlinearities to the electrical signal as do the fluids which flow against the probe surfaces. Moreover, this probe head configuration is suitable for use in sensing the velocity of a bidirectional flow since the electrodes are capable of producing signals from fluids both upstream and downstream of the probe. Finally, owing to the parabolic configuration of the head portion, debris from the fluid does not collect on the probe.

Figure 7A:
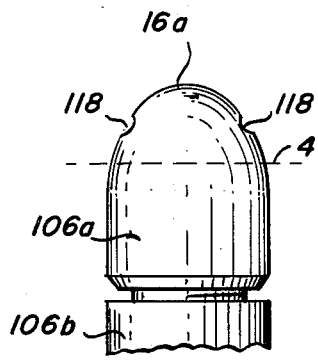
FIGS. 7a-7c are rear, side, and top views, respectively of an alternate configuration of the sensor probe head portion, the side view being a partial sectional view.
Figure 7B:
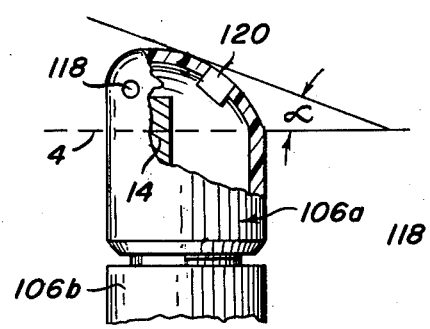
Figure 7C:
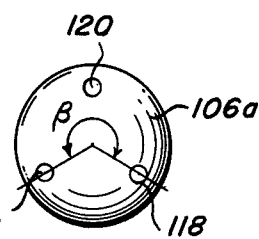
Figure 7D:
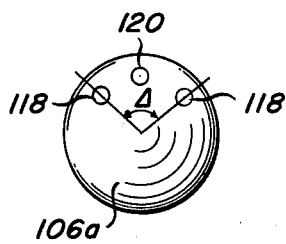
FIG. 7d is a top view of the sensor probe head portion of FIGS. 7a and 7b showing a different configuration of the sensing electrodes.

Referring now to FIGS. 7a-7d, an alternative configuration of the probe sensing head portion 106a is shown. The outer surface of the sensor probe head portion 106a has, in longitudinal cross-section relative to a plane containing the longitudinal axes of both the conduit and the probe, an oblique substantially wedge-shaped configuration to define, in the direction of fluid flow in the conduit, an acute angle $\alpha$ relative to the inner wall surface of the conduit 4 as shown in FIG. 1 which diverges from the front portion of the probe sensing head to the rear portion thereof. More particularly, the angle $\alpha$ is an acute angle between the conduit inner wall surface and a line substantially tangent to the surface of the probe heat portion. The diverging angle $\alpha$ may be in the range between 25° and 35° and is preferably 30°. With such a configuration, the sensor probe head portion is particularly adapted for shedding debris which may be contained in the fluid flowing through the conduit. Because the electrodes are embedded in the surface of the probe head portion and owing to the oblique configuration thereof, no obstructions are provided in the conduit to which debris may attach. The probe is thus self-cleaning to insure that accurate measuring of fluid flow is continuously afforded since the electrodes are always free of debris. As shown in FIGS. 7b, 7c, and 7d, the ground electrode 120 is embedded within the oblique outer surface of the sensor probe head portion adjacent the front peripheral portion thereof. In the arrangement of FIGS. 7a, 7b, and 7c, the sensing electrodes 118 are arranged toward the rear portion of the sensing probe head portion and are spaced by an angle $\beta$ of between 180° and 220° relative to the longitudinal axis of the probe in the direction of said ground electrode. With such an arrangement of the sensing electrode, the electrical signal produced by the electrodes contains a large number of non-linearities due to flow disturbance of the sensor and variations due to changes in Reynolds number. Accordingly, in an alternate arrangement shown in FIG. 7d, the sensing electrodes are positioned in the front portion of the probe sensing head and are spaced by an angle $\Delta$ of between 90° and 110° relative to the probe axis in the direction of the ground electrode. The electrical signal produced by the sensing electrodes arranged in FIG. 7d is more linear than that produced by the electrode configuration of FIG. 7c since the electrodes are placed where they are less affected by the sensor interference with the flow and variations due to changes in Reynolds number.

In a third embodiment shown in FIGS. 8a-8c, the outer surface of the sensor probe head portion 206a has a dome-like projection 80 which protrudes into the interior of the conduit. The transverse thickness of the projection is less than the longitudinal thickness thereof. More particularly, as shown in FIG. 8a, the sides of the projection are tapered, whereas in FIG. 8b, the front and back portions of the projection define a generally parabolic curve. The sensing electrodes 218 are centrally arranged on opposite sides of the projection and may be recessed as shown in the drawing, if desired. The ground electrode 220 is arranged in the front portion of the sensing head portion adjacent the periphery thereof as shown in FIG. 8c. The dome-like projection is capable of shedding debris in the same manner as the probe head portions shown in FIGS. 3 and 7.

While in accordance with the provisions of the Patent Statues the referred forms and embodiments of the invention have been illustrated and described, it will be apparent to those skilled in the art that various changes and modifications may be made without deviating from the inventive concepts set forth above.

What is claimed is:

1. A flow meter for measuring the velocity of fluid flow in a conduit, comprising
   (a) a generally cylindrical electromagnetic sensor probe means for generating electrical signals as a function of the velocity of fluid flow within the conduit, said probe means including a probe head and a body portion; and
   (b) means for mounting said probe means within an opening contained in the conduit with a portion of said probe head protruding into the interior of the conduit and with the longitudinal axis of said probe means extending normal to the direction of fluid flow in the conduit, the probe head portion protruding into the interior of the conduit defining a debris shedding surface facing the fluid flow and arranged at an angle other than normal to the direction of fluid flow, whereby debris is prevented from accumulating thereon;
   (c) said probe means further including
      (1) electromagnetic means having a pair of poles for generating in the fluid an electromagnetic field the axis of which extends normal to the direction of flow; and
      (2) a plurality of electrodes mounted in said probe head portion for producing said electrical signals in response to the flow of fluid through said electromagnetic field, said electrodes being arranged beyond the poles of said electromagnetic means and comprising at least a pair of sensing electrodes symmetrically arranged relative to said field axis along a line transverse to the direction of fluid flow within the conduit.

2. Apparatus as defined in claim 1, and further comprising
   (d) processing means connected with said sensor probe means for converting said electrical signals into a flow velocity output signal.

3. Apparatus as defined in claim 2, wherein said electrodes are embedded within said debris shedding surface of said sensor probe head portion.

4. Apparatus as defined in claim 3, wherein said electrodes are recessed from said debris shedding surface of said sensor probe head portion.

5. Apparatus as defined in claim 4, wherein said mounting means comprises a compression seal and ball valve assembly.

6. Apparatus as defined in claim 3, wherein said sensor probe head portion includes a pair of spaced parallel, generally parabolic portions extending from said probe body portion to define a flow trough therebetween, the flow through said trough being arranged parallel to the fluid flow in the conduit, and further wherein one of said sensing electrodes is arranged at the apex of each of said parabolic portions.

7. Apparatus as defined in claim 6, wherein said plurality of electrodes further comprises a ground electrode arranged between said parabolic portions and adjacent the periphery of said probe head portion.

8. Apparatus as defined in claim 3, wherein said debris shedding surface of said sensor probe head portion has, in longitudinal cross-section relative to a plane containing the longitudinal axes of both the conduit and said probe means, an oblique substantially wedge-shaped configuration to define, in the direction of fluid flow in the conduit, from the front portion of said head portion to the rear portion thereof, a diverging acute angle ($\alpha$) between the inner wall surface of the conduit and a line tangent to said debris shedding surface.

9. Apparatus as defined in claim 8, wherein said diverging angle is between 25° and 35°.

10. Apparatus as defined in claim 9, wherein said plurality of electrodes further comprises a ground electrode embedded within said oblique debris shedding surface of said sensor probe head portion adjacent the front peripheral portion thereof.

11. Apparatus as defined in claim 10, wherein a pair of said sensing electrodes are spaced by an angle ($\beta$) of between 180° and 220° relative to the axis of said probe means in the direction of said ground electrode.

12. Apparatus as defined in claim 10, wherein a pair of said sensing electrodes are spaced by an angle ($\Delta$) of between 90° and 110° relative to the axis of said probe means in the direction of said ground electrode.

13. Apparatus as defined in claim 3, wherein said debris shedding surface of said sensor probe head portion has a dome-like configuration, the transverse thickness of which is less than the longitudinal thickness thereof in the direction of fluid flow from the front portion of said head portion to the rear portion thereof.

14. Apparatus as defined in claim 13, wherein said sensing electrodes are centrally arranged on opposite sides of said dome-like head portion, and further wherein said plurality of electrodes includes a ground electrode arranged on the front portion of said probe head portion adjacent the periphery thereof.

15. Apparatus as defined in claim 6, wherein said processing means includes means for modifying said electrical signals to correct nonlinearities in Reynolds number.

16. Apparatus as defined in claim 15, wherein said modifying means includes
   (1) multiplier means for squaring a portion of said electrical signals; and
   (2) adder means for adding said squared portion of said signal to said original signal, thereby to provide a first order correction for changes in fluid flow profiles resulting from increasing velocity.

17. Apparatus as defined in claim 16, wherein said processing means further includes means for adjusting said electrical signals from said electrodes in accordance with the mean velocity of the fluid flowing through the conduit.

* * * * *